US012616336B2

(12) United States Patent (10) Patent No.: US 12,616,336 B2
Cho et al. (45) Date of Patent: May 5, 2026

(54) COOKING DEVICE

(71) Applicants:GUANGDONG MIDEA KITCHEN APPLIANCES MANUFACTURING CO., LTD., Foshan (CN); MIDEA GROUP CO., LTD., Foshan (CN)

(72) Inventors: Jaeman Cho, Foshan (CN); Wei Li, Foshan (CN); Qihong Ling, Foshan (CN); Gang Liu, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 379 days.

(21) Appl. No.: 18/561,294

(22) PCT Filed: May 17, 2022

(86) PCT No.: PCT/CN2022/093387
§ 371 (c)(1),
(2) Date: Nov. 16, 2023

(87) PCT Pub. No.: WO2022/242656
PCT Pub. Date: Nov. 24, 2022

(65) Prior Publication Data
US 2024/0245261 A1 Jul. 25, 2024

(30) Foreign Application Priority Data
May 17, 2021 (CN) .......................... 202110535223.8

(51) Int. Cl.
*H05B 6/64* (2006.01)
*A47J 37/06* (2006.01)
(Continued)

(52) U.S. Cl.
CPC ....... *A47J 37/0641* (2013.01); *A47J 37/0786* (2013.01); *F24C 15/322* (2013.01); *H05B 6/6473* (2013.01)

(58) Field of Classification Search
CPC . A47J 37/0641; A47J 37/0786; F24C 15/322; F24C 15/325; H05B 6/6473; Y02E 60/10
(Continued)

(56) References Cited

U.S. PATENT DOCUMENTS 6,615,819 B1 * 9/2003 Hernandez Burgos ......................
F24C 15/322
126/273 R
2002/0056712 A1 * 5/2002 Kim ..................... H05B 6/6473
219/757

FOREIGN PATENT DOCUMENTS

AU 2013230261 A1 7/2014
CN 103635751 A 3/2014
(Continued)

OTHER PUBLICATIONS

Extended European Search Report Received in EP Application No. 22803976.4; mailed Sep. 26, 2024.
(Continued)

*Primary Examiner* — Quang T Van
(74) *Attorney, Agent, or Firm* — K&L Gates LLP

(57) ABSTRACT
A cooking device is provided. The cooking device includes: a housing having a cooking cavity; a gas circulation apparatus disposed in the housing and configured to drive gas in the cooking cavity to flow and circulate; and a heating apparatus disposed in the cooking cavity and adjacent to air holes. The gas circulation apparatus includes a gas driving part. The gas driving part includes a driving cover body and a fan blade part rotatably disposed in the driving cover body. The driving cover body has air holes provided on the side surface of the driving cover body facing towards the cooking
(Continued)

cavity. The heating apparatus includes an outer peripheral heating apparatus, and the area enclosed by the outer peripheral heating apparatus accounts for at least half of the cross-sectional area of the cooking cavity.

20 Claims, 8 Drawing Sheets

(51) Int. Cl.
  *A47J 37/07* (2006.01)
  *F24C 15/32* (2006.01)
(58) Field of Classification Search
  USPC ....... 219/681, 680, 683, 686, 697, 400, 401, 219/492, 494; 126/21 A
  See application file for complete search history.

(56) References Cited

FOREIGN PATENT DOCUMENTS

| | | | |
|---|---|---|---|
| CN | 203615383 | U | 5/2014 |
| CN | 103884030 | A | 6/2014 |
| CN | 104613515 | A | 5/2015 |
| CN | 206371926 | U | 8/2017 |
| CN | 207202765 | U | 4/2018 |
| CN | 209090950 | U | 7/2019 |
| CN | 110150995 | A | 8/2019 |
| CN | 209437019 | U | 9/2019 |
| CN | 110742516 | A | 2/2020 |
| CN | 211559784 | U | 9/2020 |
| CN | 211748992 | U | 10/2020 |
| CN | 111904294 | A | 11/2020 |
| CN | 111990898 | A | 11/2020 |
| CN | 212394654 | U | 1/2021 |
| CN | 212972746 | U | 4/2021 |
| CN | 113143052 | A | 7/2021 |
| JP | S6122131 | A | 1/1986 |
| JP | 2014228264 | A | 12/2014 |

OTHER PUBLICATIONS

ISR received in PCT/CN2022/093387; mailed Jul. 29, 2022.
First OA received in CN Application No. 202110535223.8; mailed Dec. 28, 2023.
Written Opinion of the ISA received in PCT/CN2022/093387; mailed Jul. 29, 2022.
The Office Action received in the counterpart EP Application No. 22803976.4, dated Aug. 19, 2025, 6 pages.

* cited by examiner

COOKING DEVICE

CROSS-REFERENCES TO RELATED APPLICATIONS

The present disclosure is a national phase application of International Application No. PCT/CN2022/093387, filed on May 17, 2022, which claims priority to Chinese Patent Application No. "202110535223.8" filed on May 17, 2021, the entire contents of which are incorporated herein by reference.

FIELD

The present application relates to the field of kitchen appliances, and more particularly to a cooking device.

BACKGROUND

In the related art, in a microwave oven with an air frying function, the structural layout is unreasonable, resulting in uneven heat distribution, poor heat circulation, and poor food cooking coloring effect.

SUMMARY

The present application aims to solve at least one of the problems existing in the prior art. To this end, one object of the present application is to provide a cooking device capable of forming a large area of heating in a cooking cavity, improving heating evenness.

A cooking device according to an embodiment of the present application includes a housing, a gas circulation apparatus and a heating apparatus. The housing has a cooking cavity. The gas circulation apparatus is disposed in the housing and configured to drive gas in the cooking cavity to flow and circulate. The gas circulation apparatus includes a gas driving part. The gas driving part includes a driving cover body and a fan blade part rotatably disposed in the driving cover body, and the driving cover body has air holes being provided on a side surface of the driving cover body facing towards the cooking cavity. The heating apparatus is disposed in the cooking cavity and adjacent to air holes. The heating apparatus includes an outer peripheral heating apparatus, and an area enclosed by the outer peripheral heating apparatus accounts for at least half of a cross-sectional area of the cooking cavity.

A cooking device according to an embodiment of the present application, by forming air holes at the driving cover body, and accounting the area enclosed by the outer peripheral heating apparatus for at least half of the cross-sectional area of the cooking cavity, a large area of heating may be formed in the cooking cavity, food can be cooked in a greater range, and hot air evenness can be improved; and the air holes cooperate with the heating apparatus to make hot air and barbecue better.

In addition, the above cooking device according to the embodiments of the present application may further have the following additional embodiments:

According to some embodiments of the present application, the area enclosed by the outer peripheral heating apparatus accounts for one-half to three-quarters of the cross-sectional area of the cooking cavity.

According to some embodiments of the present application, the heating apparatus further includes an inner peripheral heating apparatus surrounded by the outer peripheral heating apparatus, and the inner peripheral heating apparatus is connected in series or in parallel with the outer peripheral heating apparatus.

According to some embodiments of the present application, each of the outer peripheral heating apparatus and the inner peripheral heating apparatus is arranged around a central axis of the cooking cavity.

According to some embodiments of the present application, a total area of air holes accounts for at least half of the cross-sectional area of the cooking cavity.

According to some embodiments of the present application, the total area of air holes accounts for one-half to two-thirds of the cross-sectional area of the cooking cavity.

According to some embodiments of the present application, air holes include return air holes and outlet air holes disposed around the return air holes.

According to some embodiments of the present application, the outlet air holes include a first ring of outlet air holes, a second ring of outlet air holes and a third ring of outlet air holes. The first ring of outlet air holes is disposed around the second ring of outlet air holes, and the second ring of outlet air holes is disposed around the third ring of outlet air holes. An area of each air hole in the first ring of outlet air holes is smaller than an area of each air hole in the second ring of outlet air holes, and/or an area of each air hole in the third ring of outlet air holes is smaller than the area of each air hole in the second ring of outlet air holes.

According to some embodiments of the present application, the outlet air holes include a first ring of outlet air holes, a second ring of outlet air holes and a third ring of outlet air holes. The first ring of outlet air holes is disposed around the second ring of outlet air holes, and the second ring of outlet air holes is disposed around the third ring of outlet air holes. An air pressure of gas blown out through the first ring of outlet air holes is greater than an air pressure of gas blown out through the second ring of outlet air holes.

According to some embodiments of the present application, an area of each air hole in the return air holes is smaller than the area of each air hole in the second ring of outlet air holes.

According to some embodiments of the present application, the driving cover body includes a driving cover body bottom wall. The driving cover body bottom wall includes a driving cover body central bottom wall and a driving cover body peripheral bottom wall disposed around the driving cover body central bottom wall. At least a part air holes of the first ring of outlet air holes and the second ring of outlet air holes is disposed at the driving cover body peripheral bottom wall, and at least a part air holes of the third ring of outlet air holes and the return air holes is disposed on the driving cover body central bottom wall.

According to some embodiments of the present application, the driving cover body central bottom wall is a flat bottom wall, the driving cover body peripheral bottom wall is a divergent bottom wall, and a small diameter end of the driving cover body peripheral bottom wall is connected to the driving cover body central bottom wall.

According to some embodiments of the present application, the heating apparatus further includes an inner peripheral heating apparatus surrounded by the outer peripheral heating apparatus, and an interface between the second ring of outlet air holes and the third ring of outlet air holes corresponds to the inner peripheral heating apparatus.

According to some embodiments of the present application, a ratio of a total area of the outlet air holes and a total area of the return air holes ranges from three to one-quarter.

According to some embodiments of the present application, the driving cover body includes a driving cover body top wall and a driving cover body side wall. The driving cover body side wall is formed as a divergent side wall, a small diameter end of the driving cover body side wall is connected to the driving cover body top wall, and a large diameter end of the driving cover body side wall faces away from the driving cover body top wall.

According to some embodiments of the present application, the driving cover body side wall has a virtual extension surface extending towards the cooking cavity, a range formed by deflecting a predetermined small angle β towards two sides of the virtual extension surface with a large diameter end of the driving cover body side wall as a fulcrum is a predetermined range, and a peripheral edge of the heating apparatus does not exceed the predetermined range.

According to some embodiments of the present application, the small angle β satisfies a relationship: $0°<β≤10°$.

According to some embodiments of the present application, an included angle γ between the driving cover body side wall and the cross-section of the cooking cavity ranges from 15° to 75°.

According to some embodiments of the present application, when driven by the gas driving part, gas has a first part flowing in a first direction and a second part flowing in a second direction. One of the first direction and the second direction being a circumferential direction of the gas driving part, and another of the first direction and the second direction being a radial direction of the gas driving part.

Additional aspects and advantages of the present application will be set forth in part in the description which follows and, in part, will be obvious from the description, or may be learned by practice of the present application.

BRIEF DESCRIPTION OF THE DRAWINGS

The foregoing and/or additional aspects and advantages of the present application will become apparent and readily appreciated from the following description of the embodiments, taken in conjunction with the accompanying drawings of which.

Figures 1, 2:
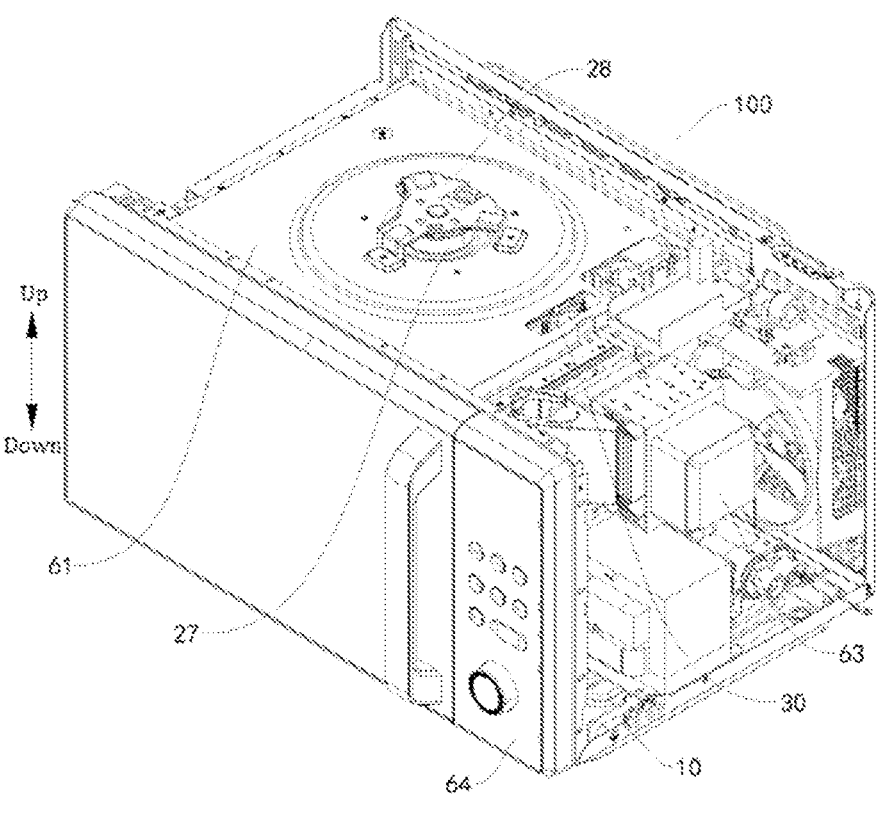
FIG. 1 is a schematic structural diagram of a cooking device according to an embodiment of the present application.
FIG. 2 is a longitudinal sectional view of FIG. 1.

REFERENCE NUMERALS cooking device 100;

housing 10; cooking cavity 101; first cooking cavity 102; second cooking cavity 103; support mating edge 11;

gas circulation apparatus 20;

gas driving part 21; gas driving part cavity 211; annular gap 212; minimum gap 213; maximum gap 214;

driving cover body 22;

driving cover body top wall 221; outer annular top wall 225; middle part top wall 226;

driving cover body side wall 222;

driving cover body bottom wall 223; inner concave cavity body 227; driving cover body central bottom wall 228; driving cover body peripheral bottom wall 229; virtual extension surface 224;

fan blade part 23; horizontal fan blade 231; vertical fan blade 232;

air hole 24; return air hole 241; outlet air hole 242; first ring of outlet air holes 243; second ring of outlet air holes 244; third ring of outlet air holes 245;

air deflector 25; top plate 26;

driving motor 27; motor support 28;

heating apparatus 30; outer peripheral heating apparatus 31; inner peripheral heating apparatus 32;

shelf apparatus 40; gas flow channel 401; air induction section 402;

top shelf 41; top shelf bottom wall 411; top shelf side wall 412;

bottom shelf 42; bottom shelf bottom wall 421; bottom shelf side wall 422;

bottom shelf support edge 43; partition support foot 44;

gas guide structure 50; outer guide structure 51; inner guide structure 52;

heat insulation plate 61; heat insulation plate support 62; microwave transmitter 63; control panel 64.

DETAILED DESCRIPTION OF THE DISCLOSURE

Reference will now be made in detail to the embodiments of the present application, examples of which are illustrated in the accompanying drawings. Wherever possible, the same or similar reference numbers will be used throughout to refer to the same or similar elements or elements having the same or similar function. The embodiments described below with reference to the figures are illustrative only, to be interpreted merely as illustrative of the present application and not to be construed as limiting the present application.

In the description of the present application, it is to be understood that the terms "center", "longitudinal", "transverse", "length", "width", "thickness", "up", "down", "front", "back", "left", "right", "vertical", "horizontal", "top", "bottom", "inner", "outer", "clockwise", "counter-clockwise", "axial", "radial", "circumferential", and the like refer to orientations or positional relationships based on those shown in the drawings for ease of description and simplicity of description, not intended or suggested that the apparatus or element referred to must have a particular orientation, be constructed and operated in a particular orientation, and therefore should not be construed as limiting the present application.

In the description of the present application, "a first feature", "a second feature" may include one or more of the features, "a plurality" means two or more, the first feature being "above" or "below" the second feature may include that the first and second features are in direct contact, and may also include that the first and second features are not in direct contact but are in contact through additional features between them, the first feature being "on top of", "above" and "over" the second feature includes that the first feature is directly above and obliquely above the second feature, or merely indicates that the first feature is at a higher level than the second feature.

A shelf apparatus 40 for a cooking device 100 and the cooking device 100 according to an embodiment of the present application will be described with reference to the accompanying drawings. Here, the cooking device 100 may be an air frying device, a barbecue device, a microwave oven with an air frying function, or the like.

Figure 3:
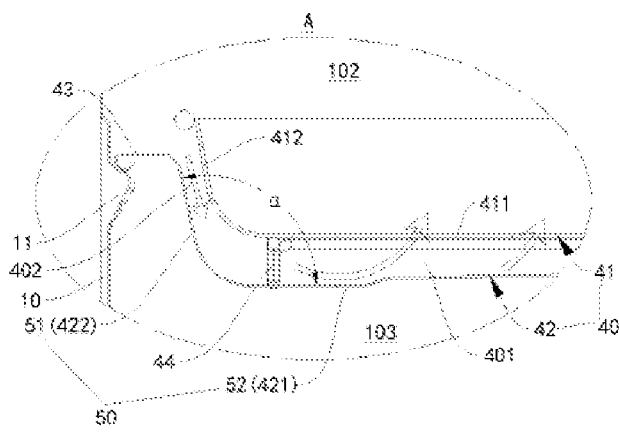
FIG. 3 is a schematic enlarged structural diagram at circle A in FIG. 2.

With reference to FIGS. 1-3, the shelf apparatus 40 for the cooking device 100 according to an embodiment of the present application may include a top shelf 41, a bottom shelf 42 and a gas guide structure 50.

Specifically, as shown in FIGS. 2-7, the top shelf 41 may be disposed above the bottom shelf 42, the top shelf 41 may be used to hold food to be cooked, and the bottom shelf 42 may support and fix a top support. Moreover, there is a gap between the top shelf 41 and the bottom shelf 42, to form a gas flow channel 401 located below the top shelf 41. The gas guide structure 50 is configured to guide the gas to the gas flow channel 401 and through the top shelf 41.

In the related art, the bottom surface of the barbecue frame is fitted with the tray without a gap, and the bottom wall of the barbecue frame has no holes. In the process of air frying, the hot air can enter into the barbecue frame only through the top opening and at least one of the through holes of the side wall of the barbecue frame to contact with the food, resulting in uneven heating of the food, for example, the lower surface of the food is completely out of contact with the hot air, the food can be cooked only from the top to the bottom or from the periphery to the middle, resulting in the lower surface of the food not being colored, or presence of cooked and rare food.

However, in some embodiments of the present application, by defining the gas flow channel 401 located below the top shelf 41 and disposing the gas guide structure 50, the shelf apparatus 40, as an accessory of the cooking device 100, not only has a bearing function, but also can play the role of drainage and air guiding. As shown in FIGS. 2 and 3, the gas guide structure 50 is configured to guide the gas to the gas flow channel 401, i.e., to the lower side of the top shelf 41, and the gas can enter the top shelf 41 from the lower side to come into contact with the lower surface of the food in the top shelf 41. The rising of the hot air further contacts the side surface and the upper surface of the food to achieve all-round three-dimensional heating, solving the problems of the lower surface of the food not being colored, or presence of cooked and rare food in the prior art.

Furthermore, in some embodiments, the top shelf 41 also has a top opening from which gas can enter into the top shelf 41, on the one hand facilitating the entry and exit of gas into and out of the top shelf 41 to achieve gas circulation and flow, and on the other hand gas can be blown from the upper side towards the food, the upper side inlet air cooperating with the lower side inlet air and the food is heated adequately and evenly.

It should be noted that the "bottom" and "top" of the bottom shelf 42 and the top shelf 41 herein do not limit the position of the two shelves in the cooking device 100, but merely indicate the relative position of the top shelf 41 and the bottom shelf 42, i.e., the top shelf 41 is disposed above the bottom shelf 42.

The shelf apparatus 40 for the cooking device 100 according to an embodiment of the present application, by defining the gas flow channel 401 between the top shelf 41 and the bottom shelf 42 and disposing the gas guide structure 50, not only has a bearing function, but also can play the role of drainage and air guiding, and the gas can enter the top shelf 41 from the lower side, achieving all-round three-dimensional heating, improving the evenness of food heating, and effectively solving the problems such as inconsistent coloring of food, presence of cooked and rare food, partial burning, etc.

The cooking device 100 according to some embodiments of the present application includes the shelf apparatus 40 for the cooking device 100 according to the embodiments of the present application. Since the shelf apparatus 40 according to the embodiments of the present application has the above beneficial effects, in the cooking device 100 according to the embodiment of the present application, by defining the gas flow channel 401 between the top shelf 41 and the bottom shelf 42 and disposing the gas guide structure 50, not only has a bearing function, but also can play the role of drainage and air guiding, and the gas can enter the top shelf 41 from the lower side, achieving all-round three-dimensional heating, improving the evenness of food heating, and effectively solving the problems such as inconsistent coloring of food, presence of cooked and rare food, partial burning, etc.

The gas guide structure 50 according to some embodiments of the present application is described below in conjunction with the figures.

Figure 4:
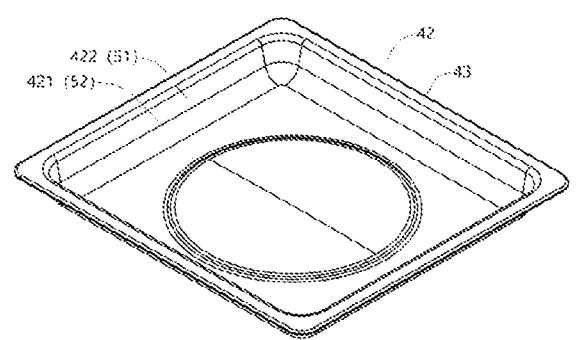
FIG. 4 is a schematic structural diagram of a bottom shelf according to an embodiment of the present application.

In some embodiments of the present application, as shown in FIGS. 2-4, the gas guide structure 50 may include an outer guide structure 51, at least a portion of which may be disposed at the periphery of the gas flow channel 401, and the outer guide structure 51 is capable of guiding gas into the gas flow channel 401 and the gas flows smoothly below the top shelf 41, reducing the resistance to gas entering the gas flow channel 401.

In some embodiments of the present application, the outer guide structure 51 may be continuously disposed at the periphery of the gas flow channel 401, for example, the outer guide structure 51 may be formed as an annular guide structure, and the outer guide structure 51 is capable of guiding the gas of the entire periphery of the gas flow channel 401, and the gas is introduced into the gas flow channel 401 from the periphery and flows towards the middle and upward to rapidly and evenly fill the gas flow channel 401 and bring this lower surface of the food into more even contact with the gas, improving the evenness of gas flux and heating.

In some embodiments, as shown in FIGS. 3 and 4, the outer guide structure 51 may include an outer guide wall disposed obliquely relative to the gas flow channel 401. The inclined outer guide wall has a small impact resistance to the gas during the guiding of the gas, avoids a loss of flow velocity, and enables the gas to have an inward flow velocity component, i.e., to have a tendency to flow towards the gas flow channel 401, and the gas, after entering the gas flow channel 401, can not only flow upward into the top shelf 41, but also flow towards the middle part of the gas flow channel 401, and then flow upward from the middle part of the gas flow channel 401 into the top shelf 41, and the gas is evenly distributed throughout the gas flow channel 401, and thus the entire lower surface of the food is evenly heated.

In some embodiments, as shown in FIGS. 2 and 3, the outer guide wall may be configured as an inclined sloped wall that extends obliquely with respect to a cross-section of the cooking device 100 (e.g., a cross-section in a horizontal direction), and an included angle α between the outer guide wall and a cross-section of the cooking device 100 may satisfy: $110°<α≤160°$. For example, in some particular embodiments, the included angle α may be 120°, 130°, 140°, 150°, etc. In the above angular range, the impact resistance of the outer guide wall to the gas is small, and the gas is evenly and adequately dispersed after entering the gas flow channel 401.

In some embodiments of the present application, as shown in FIGS. 2-4, the gas guide structure 50 may include an inner guide structure 52, at least a portion of the inner guide structure 52 may be disposed in the gas flow channel 401, and the inner guide structure 52 is configured to guide the gas in the gas flow channel 401 through the top shelf 41. The guiding action of the inner guide structure 52 makes gas entry into the top shelf 41 smoother and helps to avoid loss of gas flow velocity and improve efficiency and effectiveness of food cooking.

In some particular embodiments, as shown in FIGS. 2-4, the inner guide structure 52 may include an inner guide protrusion that protrudes towards the top shelf 41 and the flow of gas past the surface of the inner guide protrusion may change towards the top shelf 41, i.e., the gas reflects against the inner guide protrusion towards the upper portion of the cooking cavity 101 to smoothly enter the top shelf 41.

In some embodiments, as shown in FIG. 2, the inner guide protrusion may correspond to a middle part region of the top shelf 41, and when the gas guided by the inner guide protrusion enters the top shelf 41, it is guided to the middle part region of the top shelf 41, adequately heating the lower surface of the food after entering the top shelf 41.

In some particular embodiments, as shown in FIGS. 2 and 3, the inner guide protrusion may be configured as a protrusion structure with a high center and a low periphery. When the gas flows through the edge of the protrusion structure, the gas extends obliquely towards the middle and upward under the guiding action of the protrusion structure, to achieve the effect of concentrating towards the middle part of the top shelf 41, and avoid the flow velocity loss caused by the concentration of the gas in the middle part, to improve the efficiency of the gas entering the top shelf 41 and improving the cooking effect.

In some embodiments of the present application, as shown in FIGS. 2-4, the gas guide structure 50 may include both the outer guide structure 51 and the inner guide structure 52. After the outer guide structure 51 guides the gas into the gas flow channel 401, the gas can further pass through the top shelf 41 under the guidance of the inner guide structure 52. The outer guide structure 51, in cooperation with the inner guide structure 52, can greatly improve the effect of the gas entering the top shelf 41 from the lower side of the top shelf 41, to improve the evenness of the all-round heating of the food.

In the embodiment of the present application, the particular structure of the gas guide structure 50 may be flexibly disposed according to practical situations.

In some embodiments, the gas guide structure 50 and the bottom shelf 42 may be separate pieces connected together, for example, the gas guide structure 50 may be a bent and extended plate mounted between the bottom shelf 42 and the top shelf 41 to guide the gas.

In other embodiments, the gas guide structure 50 may be integrally formed in the bottom shelf 42, in other words, the gas guide structure 50 may be part of the bottom shelf 42. Specifically, as shown in FIGS. 2-4, the bottom shelf 42 may include the bottom shelf bottom wall 421 and the bottom shelf side wall 422. The inner guide structure 52 may be disposed on the bottom shelf bottom wall 421 to be located below the top shelf 41; the bottom shelf side wall 422 may be configured as the outer guide structure 51 and located at the periphery of the top shelf 41. As a result, there is no need to mount the gas guide structure 50, which also reduces the space and production costs, and is easy for users to clean.

In some embodiments of the present application, as shown in FIG. 2, the shelf apparatus 40 may be configured to partition a cooking cavity 101 into a first cooking cavity 102 and a second cooking cavity 103, and a heating apparatus 30 may be disposed in the first cooking cavity 102 to heat the gas and food in the first cooking cavity 102. The gas circulation apparatus 20 is configured to drive gas in the first cooking cavity 102 to flow and circulate, and the shelf apparatus 40 may obstruct the gas in the first cooking cavity 102 from flowing into the second cooking cavity 103 by means of partition. As a result, by partitioning the cooking cavity 101 by the shelf apparatus 40, heat may be concentrated in the first cooking cavity 102 to create a high heat density space, and the food can be exposed to a more adequately high temperature hot air environment to improve the dehydration efficiency and coloring effect of the food surface.

In some embodiments, the ratio of the height of the first cooking cavity 102 to the height of the second cooking cavity 103 is smaller than one-half, allowing heat to be more adequately concentrated in the first cooking cavity 102, creating a higher heat density space, to allow food to be cooked by high temperature hot air, and then achieving a more excellent cooking effect.

In some embodiments of the present application, as shown in FIGS. 3 and 4, the bottom shelf 42 may also include a bottom shelf support edge 43. The bottom shelf support edge 43 may be connected to an upper end of the bottom shelf side wall 422, and the bottom shelf 42 may be mounted to the cooking device 100 through the bottom shelf support edge 43.

In some particular embodiments, as shown in FIGS. 2 and 3, the cooking device 100 includes a housing 10 having the cooking cavity 101, a side wall of the cooking cavity 101 may be provided with a support mating edge 11, and the bottom shelf support edge 43 may be supported on the support mating edge 11 to achieve a support stop of the bottom shelf 42 in the cooking cavity 101.

In addition, at least one of the bottom shelf support edge 43 and the support mating edge 11 may be an annular edge to shield the space above the shelf apparatus 40 from gas, and gas flows as far as possible into the top shelf 41, and does not easily flow from the periphery of the shelf apparatus 40 to the space below the shelf apparatus 40, to reduce the space size of gas flow, which is conducive to improving cooking efficiency and reducing energy consumption.

In some embodiments, the side wall of the cooking cavity 101 may be provided with support mating edges 11. Support mating edges 11 are arranged at longitudinal intervals, and the bottom shelf support edge 43 may mate with the support mating edges 11 at any height therein to adjust the mounting height of the shelf apparatus 40, to adjust the space size above the shelf apparatus 40, and adjusting the heating effect of the food in the top shelf 41.

Of course, the support structure of the bottom shelf 42 includes, but is not limited to, the bottom shelf support edge 43. In other embodiments, the bottom of the bottom shelf 42 may be provided with a bottom shelf support foot that may be supported on the bottom wall of the cooking cavity 101, and the bottom shelf 42 is spaced from the bottom wall of the cooking cavity 101 by a certain distance, to reduce the space size above the shelf apparatus 40 for hot air circulation and increasing heat density.

Figure 5:
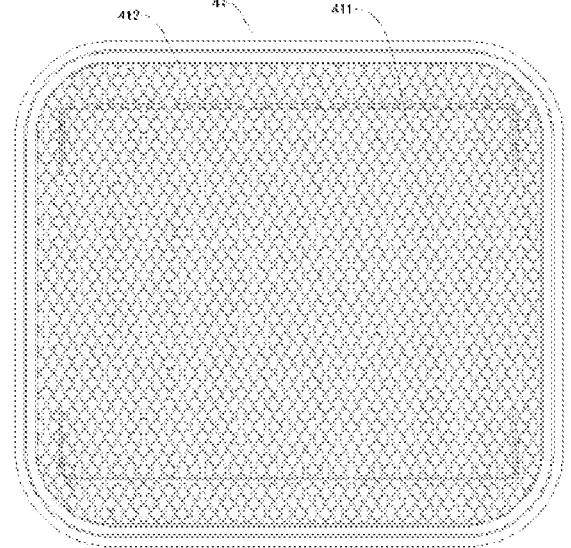
FIG. 5 is a top view of a top shelf according to an embodiment of the present application.
Figure 6:
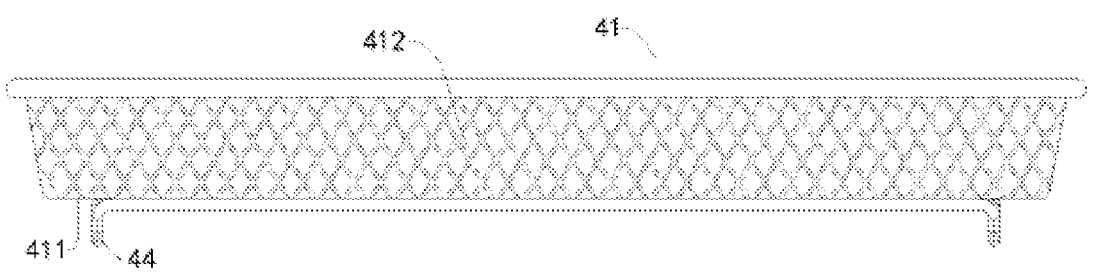
FIG. 6 is a front view of a top shelf (not showing a mesh structure) according to an embodiment of the present application.

In some embodiments of the present application, as shown in FIGS. 3 and 5-6, the top shelf 41 may have a top shelf bottom wall 411 and a top shelf side wall 412. As shown in FIGS. 3 and 4, the bottom shelf 42 may include a bottom shelf bottom wall 421 and a bottom shelf side wall 422.

Figure 7:
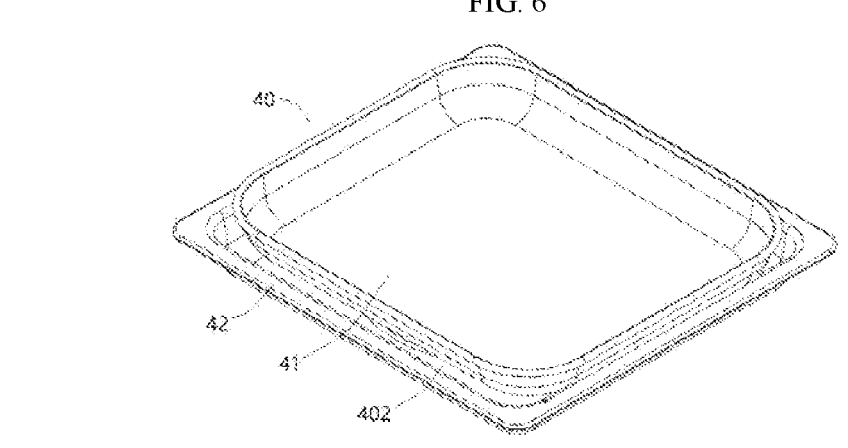
FIG. 7 is a schematic structural diagram of a shelf apparatus according to an embodiment of the present application.
Figure 8:
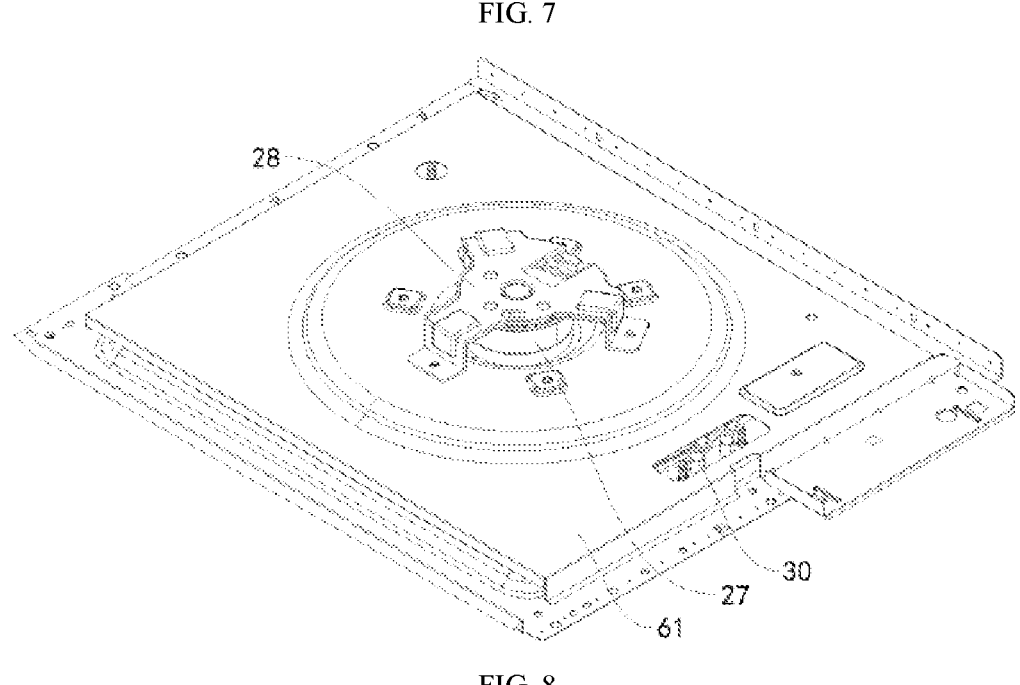
FIG. 8 is a schematic partial structural diagram of a cooking device according to an embodiment of the present application.

As shown in FIGS. 3-7, the top shelf bottom wall 411 may be spaced apart from the bottom shelf bottom wall 421 to define the gas flow channel 401, and the top shelf bottom wall 411 may be provided with a mesh (the mesh structure provided on the top shelf 41 is not shown in FIG. 7), and the gas in the gas flow channel 401 may enter the top shelf 41 through the mesh on the top shelf bottom wall 411. Of course, the structure of the top shelf bottom wall 411, including but not limited to that shown in FIG. 5, needs only to satisfy the requirement that gas can pass through the top shelf bottom wall 411.

As shown in FIGS. 3 and 4, the bottom shelf side wall 422 may be configured as the outer guide structure 51, and the top shelf side wall 412 may be adjacent to but spaced apart from the bottom shelf side wall 422 and an air induction section 402 may be formed therebetween. The air induction section 402 is in communication with the gas flow channel 401, the gas may first enter the air induction section 402 and flow towards the gas flow channel 401 under the guidance of the outer guide structure 51, and the air induction section 402 makes the gas flow along the outer guide structure 51 easier, to improve the guiding effect.

In some embodiments of the present application, as shown in FIG. 6, the top shelf side wall 412 may be provided with a mesh, and the top shelf 41 may be formed as a metal shelf with a mesh structure for both the bottom wall and the top wall. And the gas in the air induction section 402 may not only flow into the gas flow channel 401, but also be blown into the top shelf 41 from the side surface through the mesh of the top shelf side wall 412 to blow from the side surface to the food, to improve the evenness of heating and coloring consistency of the side of the food.

In other embodiments of the present application, the top shelf side wall 412 may be configured as an annular continuous wall. In other words, no mesh structure is disposed on the top shelf side wall 412, and the air in the air induction section 402 can completely flow into the gas flow channel 401, to increase the amount of air entering the top shelf 41 from the lower side. Moreover, the surface of the top shelf side wall 412 facing away from the air induction section 402 may guide the gas. Gas flowing there from the top opening of the top shelf 41 along the top shelf side wall 412 may flow from the side surface to the food in the top shelf 41, to improve the all-round heating effect of the food.

In some embodiments, as shown in FIG. 3, the top shelf side wall 412 and the bottom shelf side wall 422 may be parallel to each other, or the top shelf side wall 412 and the bottom shelf side wall 422 may be at an angle of no more than 30°, to avoid that the local flow area of the air induction section 402 is too small to affect the air intake. The air pressure of the gas in the air induction section 402 remains substantially constant, enabling more gas flow into the gas flow channel 401 and more adequate contact between the lower surface of the food and the gas.

In some embodiments of the present application, as shown in FIG. 3, the top shelf side wall 412 may extend upwardly beyond the bottom shelf side wall 422, in other words, the upper end of the top shelf side wall 412 is higher than the upper end of the bottom shelf side wall 422, and the distance between the overhanging portion of the top shelf side wall 412 and the side wall of the cooking cavity 101 is greater than the distance between the top shelf side wall 412 and the bottom shelf side wall 422, and the overhanging portion of the top shelf side wall 412 may first play a certain role in guiding the gas to more easily enter the air induction section 402.

In some embodiments of the present application, as shown in FIGS. 3 and 5, the top shelf bottom wall 411 may be provided with a partition support foot 44. The partition support foot 44 may be supported on the bottom shelf bottom wall 421 to allow the bottom shelf bottom wall 421 and the top shelf bottom wall 411 to be spaced up and down to form the gas flow channel 401 between the bottom shelf bottom wall 421 and the top shelf bottom wall 411 while achieving a support stop of the top shelf 41. The structure defining the gas flow channel 401 is simple and stable, and the structure of the partition support foot 44 is simple, small in volume, and small in resistance to the gas flowing from the air induction section 402 and the gas flow channel 401.

In some embodiments, the partition support foot 44 may be a protrusion integrally formed in the top shelf bottom wall 411, with a more stable structure. In other embodiments, as shown in FIG. 3, the partition support foot 44 may include a support part on which the top shelf bottom wall 411 is supported, and a foot part disposed on an underside of the support part and supported on the bottom shelf bottom wall 421.

In one particular embodiment of the present application, as shown in FIGS. 2-7, the bottom shelf 42 is formed as a baking tray and the top shelf 41 is formed as a baking basket. The baking tray is fixed inside the cooking cavity 101 through the bottom shelf support edge 43, and the cooking cavity 101 is partitioned into an upper and a lower space. The cooking cavity 101 is partitioned and heat is concentrated in the upper space, creating a high heat dense space, and food is in an adequately high temperature hot air environment. The bottom shelf side wall 422 may be an inclined edge to form the outer guide structure 51 and maintain a gap distance from the baking basket. In this way, hot air may flow along the side wall of the cooking cavity 101 to the bottom shelf side wall 422, and the bottom shelf side wall 422 plays a role of guiding more hot air to flow along the gap between the baking tray and the baking basket towards the bottom of the baking basket by using the inclined edge.

The center of the baking tray is a protruding circular contoured structure formed as the inner guide structure 52, and the gas flow channel 401 forms as a flow channel with low four sides and high center. The hot air hits the bottom shelf bottom wall 421 and is reflected to flow towards the upper part of the cooking cavity 101. The hot air flows through the circular contoured structure and is guided to the center and passes through the mesh of the baking basket to heat the bottom of the food. The bottom of the baking basket is provided with the partition support foot 44 that separates the contact with the surface of the baking tray, and the baking tray and the baking basket have more space for hot air flow. The hot air flows through the mesh around the baking basket to heat the food in three dimensions. The gas circulation apparatus 20 and the heating apparatus 30 at the top of the cooking cavity 101 continuously supply hot air to form a full range of three-dimensional heating on the bottom, top and side of the food, achieving an excellent cooking effect. At the same time, the baking tray also has the function of an oil receiving tray, and the waste materials generated when food is heated may flow to the baking tray through the mesh of the baking tray, improving the easy cleaning of the cooking cavity 101.

A cooking device 100 according to some embodiments of the present application will now be described with reference to the accompanying drawings.

In some embodiments of the present application, as shown in FIGS. 1 and 2, the cooking device 100 may include the housing 10 and a gas circulation apparatus 20. The housing 10 has the cooking cavity 101 therein, and the cooking cavity 101 may be used for placing food directly or for placing a container for food (such as the shelf apparatus 40), for placing food indirectly. The gas circulation apparatus 20 may be disposed on the housing 10, and the gas circulation apparatus 20 may be configured to drive gas in the cooking cavity 101 to flow and circulate to heat and cook the food in the cooking cavity 101.

With reference to FIGS. 2 and 8 to 11, the gas circulation apparatus 20 may include a gas driving part 21, when driven by the gas driving part 21, gas has a first part flowing in a first direction and a second part flowing in a second direction. The first direction may be a circumferential direction of the gas driving part 21, and the second direction may be a radial direction of the gas driving part 21. Alternatively, the first direction may be a radial direction of the gas driving part 21, and the second direction may be a circumferential direction of the gas driving part 21.

In some embodiments, a third portion of the driven gas may move in a third direction which is axial to the gas driving part 21, to improve the adequacy of convection.

The cooking device 100 according to an embodiment of the present application, the gas is driven to move in the first direction and the second direction by the gas driving part 21, and the gas can adequately flow in the cooking cavity 101, increasing the heat convection generation area and generation intensity in the cooking cavity 101, ensuring an even temperature field and heat convection in the cooking cavity 101, enabling the food to be more quickly dehydrated and colored, and solving the problem of burning the surface of the food caused by inadequate and uneven heat convection, and enabling the temperature monitoring data to more accurately reflect the heating temperature of the food to achieve accurate control of the heating process.

Figures 9, 10:
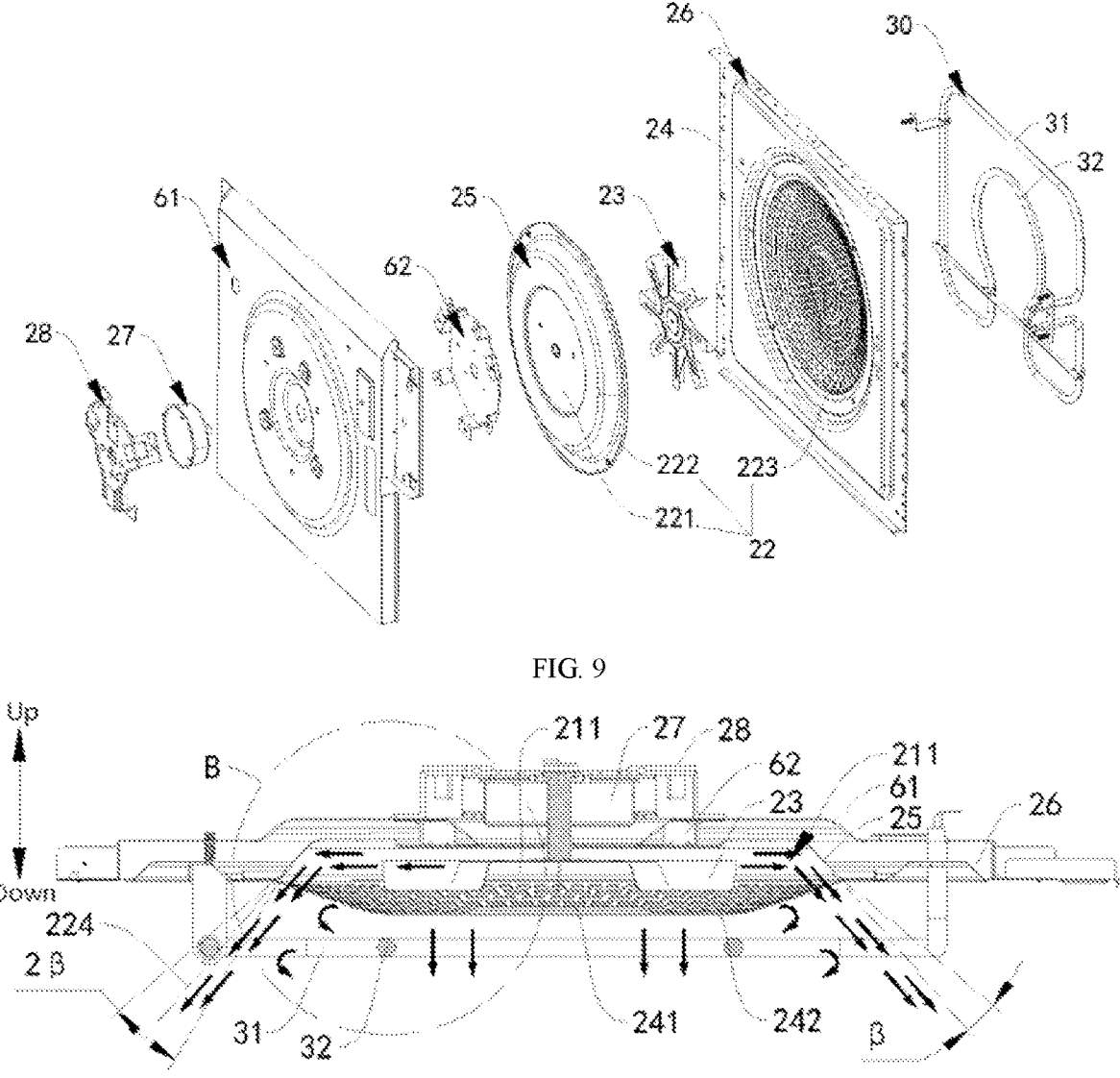
FIG. 9 is an exploded view of FIG. 8.
FIG. 10 is a cross-sectional view of FIG. 8.
Figure 11:
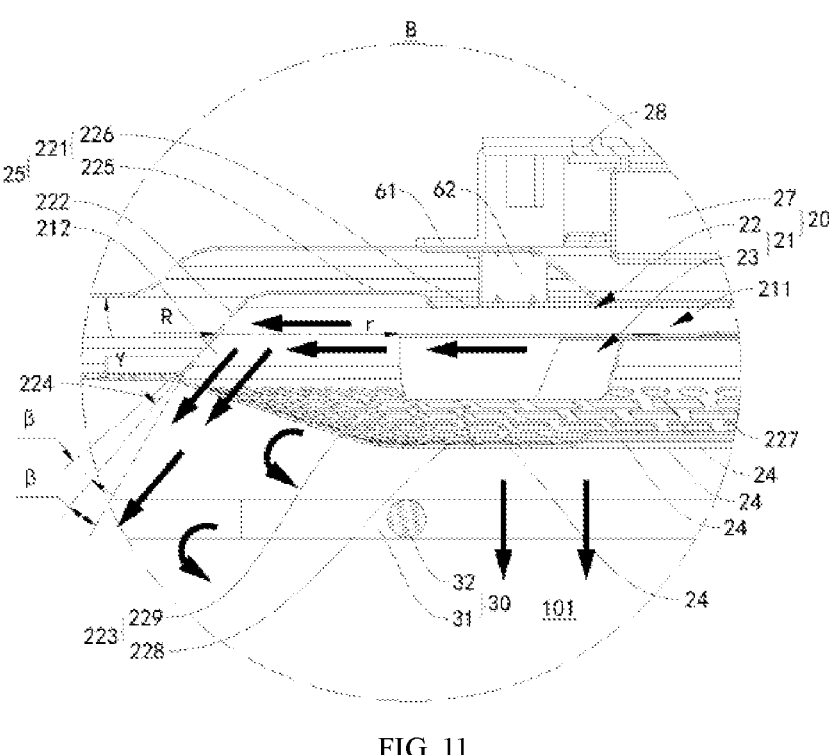
FIG. 11 is a schematic enlarged structural diagram at circle B in FIG. 10.

In some embodiments of the present application, as shown in FIGS. 2 and 10-11, the gas driving part 21 may have a gas driving part cavity 211 provided therein, and the gas driving part 21 includes a fan blade part 23. At least a portion of the fan blade part 23 is disposed in the gas driving part cavity 211 and rotation of the fan blade part 23 drives gas in the gas driving part cavity 211 to flow in a first direction and a second direction, out of the gas driving part cavity 211 in the first direction and the second direction, and into the cooking cavity 101.

Figure 12:
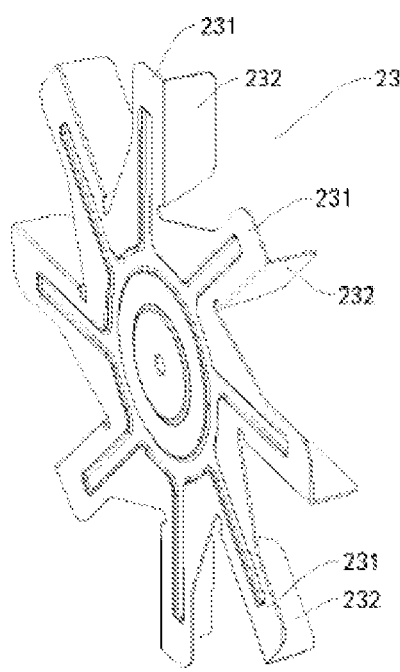
FIG. 12 is a schematic structural diagram of a fan blade part according to an embodiment of the present application.

In some embodiments, as shown in FIGS. 10 and 12, the fan blade part 23 may include a horizontal fan blade part 231 and a vertical fan blade part 232. The upper end of the vertical fan blade part 232 is connected to the horizontal fan blade part 231, and the fan blade generally forms an "L" shape. When the fan blade rotates, the gas flowing through the fan blade part 23 is pressed and accelerated, and a part of the gas flows vertically downward, a part of the gas flows in the radial direction of the fan blade part 23, and a part of the gas flows in the circumferential direction of the fan blade part 23 by the fan blade due to viscosity. In addition, the fan blade part 23 further includes a fan blade disc, and the inner ends of horizontal fan blades 231 are connected to the periphery of the fan blade disc, and the gas can flow from the middle part to the fan blade part 23, and then flow through the horizontal fan blades 231 and the vertical fan blades 232 and out to achieve the gas circulation flow.

In some embodiments of the present application, as shown in FIGS. 10 and 11, there is an annular gap 212 between the fan blade part 23 and the periphery of the gas driving part cavity 211, and adequate space is formed to allow adequate gas flow in the radial direction of the gas driving part 21. Moreover, the width of the annular gap 212 in the radial direction of the gas driving part cavity 211 varies. In other words, the radial width of annular gap 212 is uneven circumferentially throughout. In other words, the annular gap 212 includes at least two or more sections, and the radial width of at least one section of the annular gap 212 is not equal to the radial width of another section of the annular gap 212. The flow of gas in the annular gap 212 creates a circumferential pressure differential that further urges the gas to flow circumferentially, further enhancing the forced convection of the helical flow, to enhance the gas convection effect.

Figure 14:
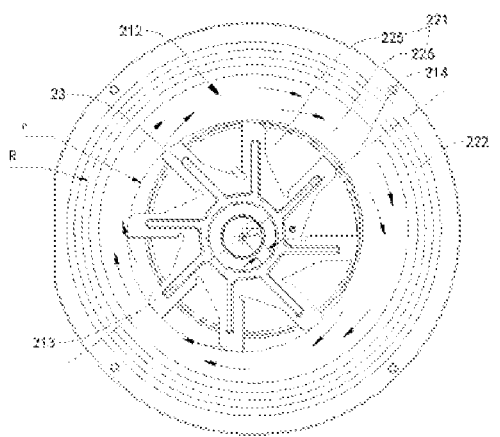
FIG. 14 is a schematic structural diagram of an air deflector and a fan blade part according to an embodiment of the present application.

In some embodiments, as shown in FIGS. 10 and 14, the fan blade part 23 and the gas driving part cavity 211 may be eccentrically disposed. In other words, the rotation circumference of the fan blade part 23 does not coincide with the central axis of the gas driving part cavity 211. Thus, there is an uneven annular gap 212 between the periphery of the fan blade part 23 and the periphery of the gas driving part 21. For example, the gas driving part 21 includes a driving cover body 22, the fan blade part 23 is mounted on a driving cover body top wall 221 of the driving cover body 22. The driving cover body top wall 221 is of a circular structure, and the mating relationship between the fan blade part 23 and the driving cover body top wall 221 is not concentric, namely, the two have a certain eccentric distance, and the radial gap between the driving cover body side wall 222 of the driving cover body 22 and the fan blade part 23 is unevenly distributed.

In some embodiments of the present application, as shown in FIGS. 11 and 14, the equivalent radius of the fan blade part 23 may be r, in other words, the radius corresponding to the peripheral swept area during rotation of the fan blade part 23 may be r. The inner diameter of the periphery of the gas driving part cavity 211 may be R, in other words, the radius of the periphery of the gas driving part cavity 211 at the same height as the equivalent radius r of the fan blade part 23 may be R. The eccentric distance between the fan blade part 23 and the gas driving part 21 may be e, in other words, the distance between the rotation circumference of the fan blade part 23 and the central axis of the gas driving part cavity 211 may be e. The width of the annular gap 212 may be C.

$20 \text{ mm} \leq R-r \leq 30 \text{ mm}$, $0 < e \leq 0.4(R-r)$, and $0.6(R-r) \leq C \leq 1.4(R-r)$. Within the above value range, even if a pressure difference is generated in the gas in the annular gap 212 to promote the circumferential flow of the gas, the spiral flowing gas driven by the fan blade part 23 spirals downward, to forcibly improve the heat convection, and ensuring the normal operation of the fan blade part 23, reducing the probability of generating noise during the operation.

In some embodiments of the present application, as shown in FIG. 14, the annular gap 212 has a minimum gap 213 and a maximum gap 214, i.e., the minimum and maximum radial width. The minimum gap 213 and the maximum gap 214 are respectively located on two sides of the fan blade part 23, and the annular gap 212 is partitioned into two sections evenly varying from the minimum gap 213 to the maximum gap 214, and the annular gap 212 generally forms a wedge-shaped gap, and the air pressure at the minimum gap 213 is large, and the air pressure at the maximum gap 214 is small, to forming a circumferential pressure difference, and pushing the gas to flow more smoothly in the circumferential direction between the minimum gap 213 and the maximum gap 214.

In some embodiments, the annular gap 212 has the maximum gap of smaller than or equal to 42 mm and to minimum gap of greater than or equal to 12 mm to avoid having a minimum gap that is too small to create abnormal noise and also to provide better circumferential gas flow due to pressure differences.

In other embodiments, the fan blade part 23 may be coaxially arranged with the gas driving part cavity 211, in other words, the rotation circumference of the fan blade part 23 may coincide with the central axis of the gas driving part cavity 211. Moreover, the distance between the periphery of the gas driving part cavity 211 and the central axis of the gas driving part cavity 211 varies, and the distance between the periphery of the gas driving part cavity 211 and the periphery of the fan blade part 23 varies. In some embodiments, the cross-section of the gas driving part cavity 211 may be elliptical, lemon-shaped, oil-filled wedge-shaped, or the like, to achieve an uneven radial gap of the periphery of the gas driving part cavity 211 to the fan blade part 23.

In some embodiments of the present application, as shown in FIG. 11, the gas driving part 21 may include the driving cover body 22 and the fan blade part 23. The gas driving part cavity 211 is formed at the driving cover body 22, and the fan blade part 23 is rotatably disposed in the driving cover body 22. Moreover, the driving cover body 22 may have air holes 24 provided on the side surface of the driving cover body 22 facing towards the cooking cavity 101 of the cooking device 100, and the gas in the gas driving part cavity 211 can be blown into the cooking cavity 101 through air holes 24, the contact surface between the hot air and the food is the maximum contact surface of the food, and the hot air can heat the food in a larger area to achieve a better cooking effect, or the gas in the cooking cavity 101 may enter the gas driving part cavity 211 through air holes 24. The driving cover body 22 plays a role of shielding the fan blade part 23 from being touched by human hands, and air holes 24 further enhance the gas dispersion effect.

Figure 13:
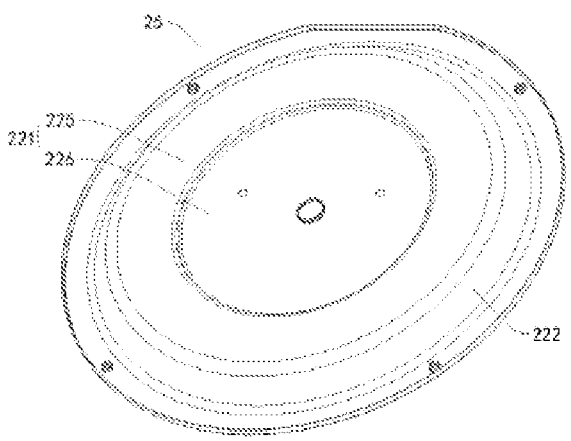
FIG. 13 is a schematic structural diagram of an air deflector according to an embodiment of the present application.

In some embodiments, as shown in FIGS. 11 and 13-14, the driving cover body 22 may include a driving cover body top wall 221 and a driving cover body side wall 222 connected to the driving cover body top wall 221 to form an "inverted basin" structure. The fan blade part 23 may be located below the driving cover body top wall 221, and the driving cover body side wall 222 is disposed around the fan blade part 23, a gap between the driving cover body side wall 222 and the fan blade part 23 is the annular gap 212, and the driving cover body side wall 222 can guide the radial and circumferential air blown by the fan blade part 23.

In some embodiments, as shown in FIGS. 10 and 11, the driving cover body side wall 222 may be formed as a divergent side wall, and the smaller diameter end of the driving cover body side wall 222 may be connected to the driving cover body top wall 221, and the larger diameter end of the driving cover body side wall 222 may be away from the driving cover body top wall 221. In other words, the inner diameter of the driving cover body side wall 222 increases in a direction facing away from the driving cover body top wall 221.

As a result, under the driving of the fan blade part 23, the gas in the gas driving part cavity 211 is divided into three kinds of flows: vertical downward flow, radial flow along the fan blade part 23, and circumferential flow along the fan blade part 23. The gas of radial flow along the fan blade part 23 first flows to the divergent driving cover body side wall 222, changes its flow direction after flowing through the driving cover body side wall 222, and then flows "straightly" in the cooking cavity 101 in the inclined direction of the driving cover body side wall 222, and may be blown to the side wall of the cooking cavity 101 and flow along the side wall, to smoothly flow to the gas guide structure 50. The gas of circumferential flow along the fan blade part 23 flows through the driving cover body side wall 222 in a spiral manner by the centrifugal force, changes its flow direction after flowing through the driving cover body side wall 222, and then flows in a spiral descending manner to the cooking cavity 101 through the air hole 24. The divergent driving cover body side wall 222 allows for more adequacy and greater coverage of heat convection, as well as more even temperature distribution in the cooking cavity 101.

In some embodiments, as shown in FIG. 11, an included angle γ between the driving cover body side wall 222 and the cross section of the cooking cavity 101 may range from 15° to 75°. In the above angular range, the air loss is small when the gas is blown to the driving cover body side wall 222, and the gas flowing through the driving cover body side wall 222 can more smoothly flow through the heating apparatus 30 and towards the side wall of the cooking cavity 101, to achieve forced convection of hot air. For example, the included angle γ may be 15°, 20°, 30°, 40°, 45°, 50°, 60°, and 70° etc.

In some embodiments of the present application, as shown in FIGS. 9-11, the cooking device 100 may include a heating apparatus 30. The heating apparatus 30 may be disposed in the cooking cavity 101 and adjacent to the driving cover body 22. The driving cover body side wall 222 has a virtual extension surface 224 extending towards the cooking cavity 101. Taking the large diameter end of the driving cover body side wall 222 as a fulcrum, the range formed by the virtual extension surface 224 deflecting a predetermined small angle β to two sides of the virtual extension surface 224 is a predetermined range, and the peripheral edge of the heating apparatus 30 does not exceed the predetermined range. In other words, the peripheral edge of the heating apparatus 30 is located in the horizontal projection range of the predetermined range of the virtual extension surface 224. In this way, the gas flowing through the driving cover body side wall 222 flows out of the driving cover body 22 generally along the virtual extension surface 224 and can be directly blown towards the heating apparatus 30 to be adequately heated by the heating apparatus 30 and then come into contact with the food in the cooking cavity 101, to improve the heat exchange effect. The heat of the heating apparatus 30 is adequately brought into the cooking cavity 101 to form a heat convection, to achieve rapid dehydration of the surface of the food.

In some embodiments, the small angle β may satisfy the relationship: 0°<β≤10°. When the value of the small angle β is too large, it is likely that part of the gas enters the cooking cavity 101 without flowing through the heating apparatus 30. In the above range, the heat exchange efficiency between the gas and the heating apparatus 30 is improved. For example, the small angle β may be 1°, 3°, 5°, 7°, and 9° etc.

In some embodiments of the present application, as shown in FIGS. 11 and 13, the driving cover body top wall 221 may include an outer annular top wall 225 and a middle part top wall 226, and the outer annular top wall 225 surrounds and connects the middle part top wall 226. The axial distance of the outer annular top wall 225 from the fan blade part 23 is greater than the axial distance of the middle part top wall 226 from the fan blade part 23. In other words, the outer annular top wall 225 extends in a direction facing away from the fan blade part 23 to form an upward first contour, and the middle part top wall 226 extends in a direction towards the fan blade part 23 to form a downward second contour, to facilitate avoiding and mounting components (such as the driving motor 27) above the driving cover body 22. The outer annular top wall 225 increases the local axial dimension of the gas driving part cavity 211 to ensure adequate radial gas flow space and to increase the structural strength of the driving cover body top wall 221.

In some embodiments, as shown in FIGS. 10 and 14, an interface of the outer annular top wall 225 and the middle part top wall 226 may correspond to the periphery of the fan blade part 23, here, "corresponding" is to be understood in a broad sense that the projection of the interface of the outer annular top wall 225 and the middle part top wall 226 onto the periphery of the fan blade part 23 in a horizontal plane may coincide completely or may be offset by a small distance in a horizontal direction. In this way, most of the outer annular top wall 225 is located radially outside of the fan blade part 23, adequate radial gas flow space and adequate radial width of the annular gap 212 are ensured.

In some embodiments, as shown in FIGS. 10 and 13, the driving cover body top wall 221 and the driving cover body side wall 222 are integrated to form an air deflector 25. The driving cover body top wall 221 and the driving cover body side wall 222 do not need to be assembled, there is no mating gap, gas leakage is avoided, and the structure is simpler.

In some embodiments of the present application, as shown in FIGS. 10-11, and 15-18, the driving cover body 22 may include a driving cover body bottom wall 223. The driving cover body bottom wall 223 may be connected to an end of the driving cover body side wall 222 facing away from the driving cover body top wall 221, and air holes 24 may be formed in the driving cover body bottom wall 223. The driving cover body bottom wall 223, the driving cover body side wall 222, and the driving cover body top wall 221 cooperate to define the gas driving part cavity 211, and the gas driving part cavity 211 can interact with the gas in the cooking cavity 101 through air holes 24 on the lower side.

In some embodiments, as shown in FIG. 11, the driving cover body bottom wall 223 may protrude in a direction facing away from the driving cover body top wall 221 and an inner concave cavity body 227 is formed at a side surface of the driving cover body bottom wall 223 facing towards the driving cover body top wall 221, and the inner concave cavity body 227 is configured as a part of the gas driving part cavity 211 in the gas driving part 21. The inner concave cavity body 227 increases the space size of the gas driving part cavity 211, ensuring that the gas may flow more adequately in the circumferential and radial direction of the fan blade part 23.

In some embodiments, the maximum depth of the inner concave cavity body 227 is not smaller than 10 mm, and the gas flow space is more abundant, e.g., may be 10 mm, 12 mm and 15 mm, etc.

In some particular embodiments, at least a portion of the fan blade part 23 may intrude into the inner concave cavity body 227, which is conductive to facilitating the fan blade part 23 to drive gas out the air holes 24 and making the structure more compact.

In some embodiments of the present application, the driving cover body side wall 222 may also be provided with a throttling protrusion protruding close to the fan blade part 23, for example, the throttling protrusion may be a throttling contour or a raised rib provided on the driving cover body side wall 222, to further increase the flow velocity of the gas after flowing through the driving cover body side wall 222, which is conducive to improving the heat convection effect and the effect of the gas flowing towards the lower surface of the food.

In some embodiments of the present application, as shown in FIGS. 9 and 10, the gas circulation apparatus 20 may further include a driving motor 27 that may be connected to the gas driving part 21 and configured to drive the gas driving part 21 to work. The driving motor 27 may be mounted on top of the gas driving part 21 to avoid affecting the gas flow.

In some embodiments of the present application, as shown in FIGS. 9 and 10, the cooking device 100 may further include a heat insulation plate 61, which may be disposed between the driving motor 27 and the gas driving part 21, to prevent the heat of the heating apparatus 30 from affecting the driving motor 27, and avoid the temperature of the driving motor 27 being too high to damage it or even cause a safety accident, to improve the safety in use.

In addition, with continued reference to FIG. 10, the heat insulation plate 61 may be connected to the gas driving part 21 via a heat insulation plate support 62 to secure the heat insulation plate 61, and a gap may be provided between the heat insulation plate 61 and the gas driving part 21 to facilitate the reduction of heat transfer and to facilitate the disposing of heat insulation material in the gap to further enhance the heat insulation effect. The driving motor 27 may be connected to the heat insulation plate 61 via the motor support 28, the driving motor 27 is fixed and stable, and the direct contact between the driving motor 27 and the heat insulation plate 61 is avoided, to improve the heat insulation effect.

In some particular embodiments, as shown in FIGS. 9-11, the cooking device 100 may include a top plate 26 formed as a cavity top wall of the cooking cavity 101. Moreover, a portion of the top plate 26 may be contoured downward to form the driving cover body bottom wall 223, in other words, the driving cover body bottom wall 223 is integrally formed with the top plate 26. The air deflector 25 is disposed above and connected to the top plate 26 to define the gas driving part cavity 211. The heat insulation plate 61 is disposed above the top plate 26, the heat insulation plate support 62 is disposed between the middle part of the heat insulation plate 61 and the air deflector 25, the periphery of the heat insulation plate 61 is connected to the top plate 26, and the middle part is connected to the air deflector 25 via the heat insulation plate support 62. The driving motor 27 is disposed above the heat insulation plate 61, and a motor shaft of the driving motor 27 passes through the heat insulation plate 61, the heat insulation plate support 62 and the air deflector 25 to be connected to the fan blade part 23. The motor support 28 is covered above the driving motor 27 and connected to the heat insulation plate 61, to achieve the mounting of the driving motor 27 and play a shielding and protection role for the driving motor 27.

Figure 19:
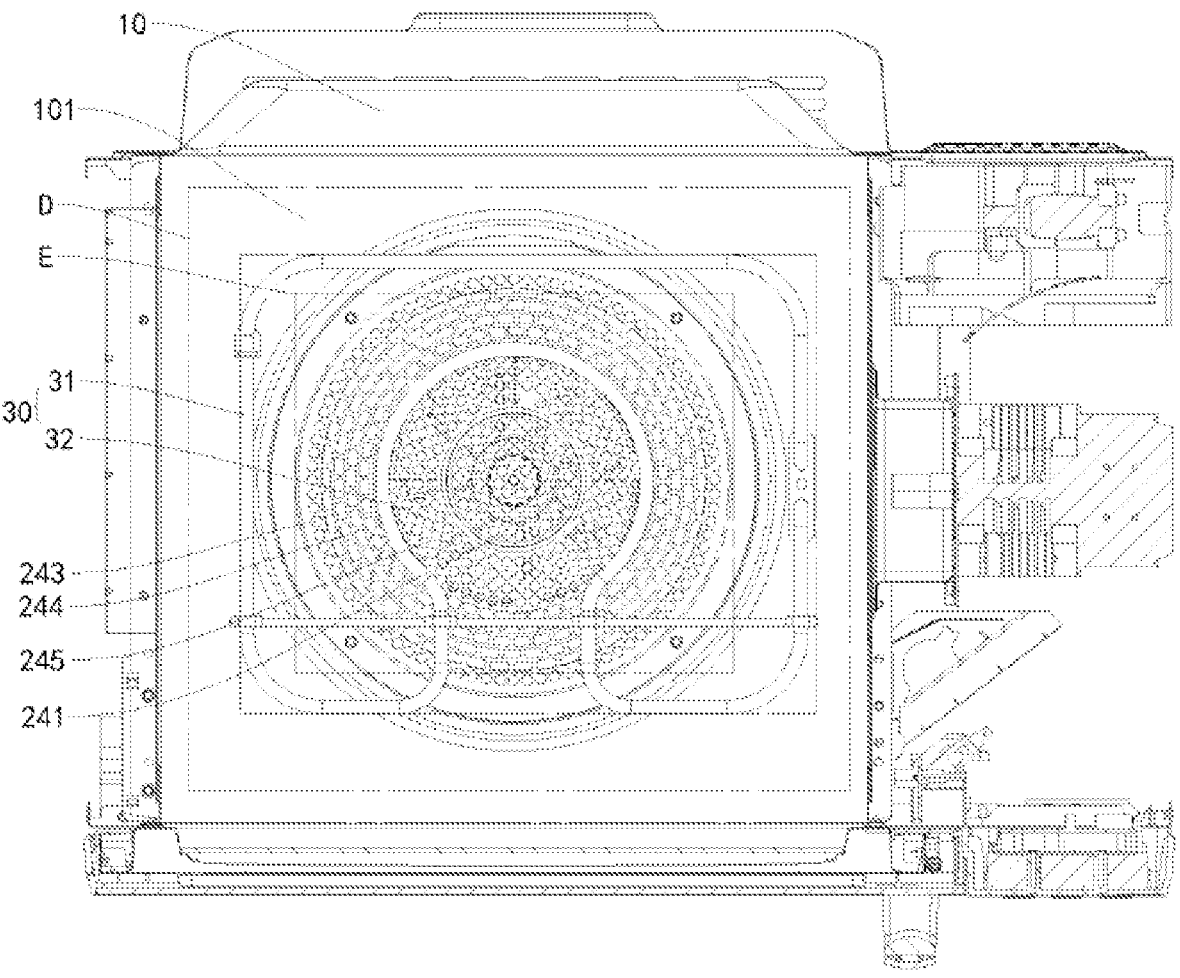
FIG. 19 is a transverse cross-sectional view of FIG. 1.

In some embodiments of the present application, as shown in FIGS. 11 and 19, the side surface of the driving cover body 22 facing towards the cooking cavity 101 may have air holes 24 through which the gas in the gas driving part cavity 211 may be blown into the cooking cavity 101. The cooking device 100 may further include a heating apparatus 30, which may be disposed in the cooking cavity 101, in other words, on the lower side of the driving cover body 22. Moreover, the heating apparatus 30 is adjacent to air holes 24 and the gas blown through the air holes 24 can be directly heated by the heating apparatus 30 and then blown to the food.

As shown in FIGS. 9 and 19, the heating apparatus 30 may include an outer peripheral heating apparatus 31, and the area enclosed by the outer peripheral heating apparatus 31 may account for at least half of a cross-sectional area of the cooking cavity 101, to form a large area of heating in the cooking cavity 101, to improve the heating effect of the heating apparatus 30 on the gas, and contributing to improving the evenness of the hot air.

The cooking device 100 according to the embodiment of the present application, by disposing air holes 24 in the driving cover body 21, and the area enclosed by the outer peripheral heating apparatus 31 accounts for at least half of the cross-sectional area of the cooking cavity 101, a large area of heating may be formed in the cooking cavity 101, food can be cooked in a greater range, and the evenness of the hot air can be improved; and the air holes 24 cooperate with the heating apparatus 30 to make hot air and barbecue better.

In some embodiments, and with continued reference to FIG. 19, the area enclosed by the outer peripheral heating apparatus 31 may account for one-half to three-quarters of the cross-sectional area of the cooking cavity 101. A range of one-half of the cross-sectional area of the cooking cavity 101 is shown at a block E in FIG. 19, and a range of three-quarters of the cross-sectional area of the cooking cavity 101 is shown at a block D. The area enclosed by the outer peripheral heating apparatus 31 is within the above range, which not only ensures a large heating area, but also avoids the heating apparatus 30 being too close to the side wall of the cooking cavity 101 to affect the gas flow, and also ensures the heating effect on the gas in the middle part of the area enclosed by the heating apparatus 30.

In some embodiments of the present application, as shown in FIGS. 11 and 19, the heating apparatus 30 may further include an inner peripheral heating apparatus 32. The outer peripheral heating apparatus 31 surrounds the inner peripheral heating apparatus 32, and the inner peripheral heating apparatus 32 may heat the gas in the middle part of the area enclosed by the outer peripheral heating apparatus 31, ensuring the heating evenness throughout a larger heating area.

As shown in FIG. 19, the inner peripheral heating apparatus 32 and the outer peripheral heating apparatus 31 may be connected in series; in other words, the inner peripheral heating apparatus 32 and the outer peripheral heating apparatus 31 may be integrally formed, which is easier to process; and the working states of the inner peripheral heating apparatus 32 and the outer peripheral heating apparatus 31 may be controlled simultaneously, which is simple and convenient to control and easy to mount. Alternatively, the inner peripheral heating apparatus 32 and the outer peripheral heating apparatus 31 may be connected in parallel, in other words, the inner peripheral heating apparatus 32 and the outer peripheral heating apparatus 31 may be composed of different heating tubes, to facilitate the shape machining and mounting position disposing of each heating tube, and to facilitate the control of the working states of the inner peripheral heating apparatus 32 and the outer peripheral heating apparatus 31 respectively, to satisfy more heating requirements.

In the embodiment of the present application, the material of the heating apparatus 30 may be flexibly disposed according to practical situations. For example, the heating apparatus 30 may be made of metal, quartz, graphene, etc.

In the embodiment of the present application, the shape of the outer peripheral heating apparatus 31 includes, but is not limited to, a square as shown in FIG. 19, and the shape of the inner peripheral heating apparatus 32 includes, but is not limited to, a circle as shown in FIG. 19. For example, the outer peripheral heating apparatus 31 and the inner peripheral heating apparatus 32 may also be polygonal, etc.

For a cooking cavity 101 with a square cross-section, the square shape of the outer peripheral heating apparatus 31 facilitates a larger hot air area. The inner peripheral heating apparatus 32 may have a central symmetrical structure to achieve a better large area hot air heating effect.

In some embodiments, as shown in FIG. 19, each of the outer peripheral heating apparatus 31, the inner peripheral heating apparatus 32 is arranged around the central axis of the cooking cavity 101 to improve temperature evenness throughout the circumference of the cooking cavity 101.

In some embodiments of the present application, the total area of air holes 24 may account for at least half of the cross-sectional area of the cooking cavity 101 to increase the gas flow area, ensure the efficiency of the gas into and out of the cooking cavity 101, improve the cooking effect and heat convection evenness.

In addition, the total area of air holes 24 may account for one-half to two-thirds of the cross-sectional area of the cooking cavity 101, to avoid that the total area of air holes 24 is too large to make machining difficult or the structural strength of the driving cover body 22 is deteriorated.

In some embodiments, as shown in FIGS. 15-18, air holes 24 may include return air holes 241 and outlet air holes 242. The outlet air holes 242 are disposed around the return air holes 241 to achieve middle part air return and surrounding air outlet, and the air flowing out from the outlet air hole 242 can adequately exchange heat with the heating apparatus 30, and can more easily enhance the heat convection effect in the sealed cooking cavity 101 to achieve a better cooking effect and evenness.

In some embodiments, air holes 24 may be arranged coaxially or diffusely.

Figure 15:
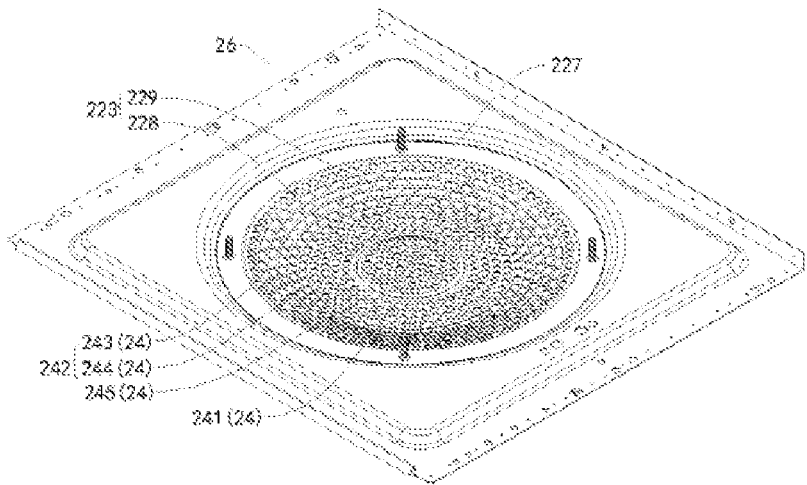
FIG. 15 is a schematic structural diagram of a top plate according to an embodiment of the present application.
Figure 16:
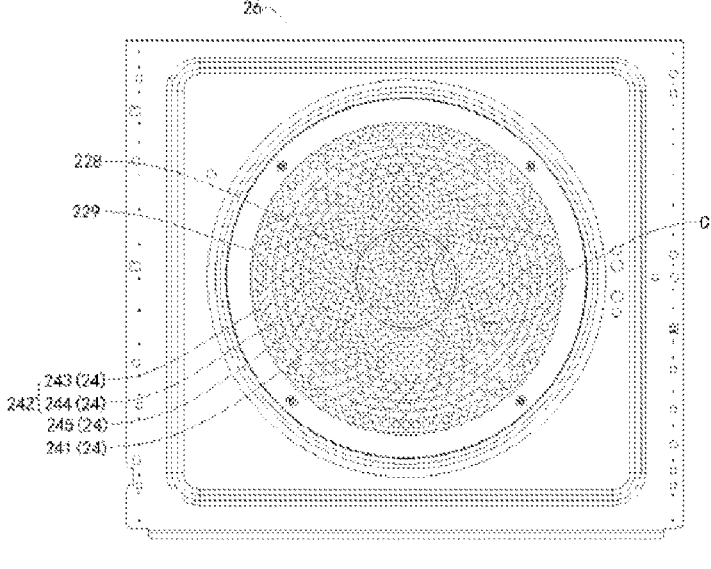
FIG. 16 is a top view of a top plate according to an embodiment of the present application.
Figure 17:
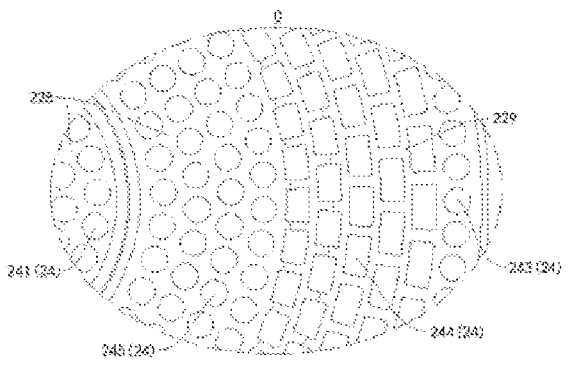
FIG. 17 is a schematic enlarged structural diagram at circle C in FIG. 16.
Figure 18:
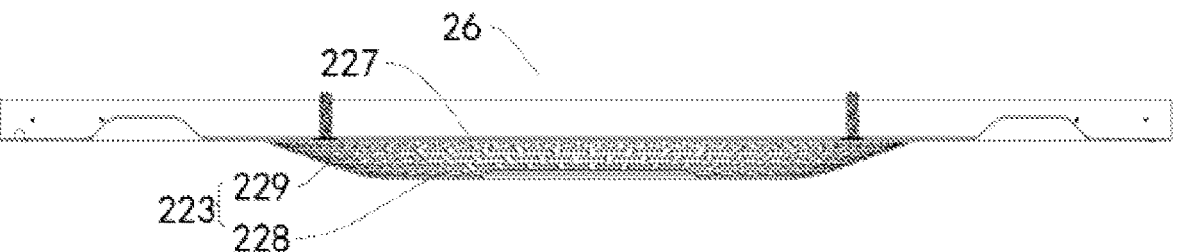
FIG. 18 is a cross-sectional view of FIG. 15.

In some particular embodiments, as shown in FIGS. 15-17, the outlet air hole 242 may include a first ring of outlet air holes 243, a second ring of outlet air holes 244, and a third ring of outlet air holes 245. The first ring of outlet air holes 243 may be disposed around the second ring of outlet air holes 244, and the second ring of outlet air holes 244 may be disposed around the third ring of outlet air holes 245. Each ring of outlet air holes may include at least one ring of outlet air hole groups, each ring of outlet air hole groups including outlet air holes 242 distributed at intervals along the circumferential direction of the driving cover body 22, and rings of outlet air hole groups may be distributed at intervals along the radial direction of the driving cover body 22.

The air pressure of the gas blown out through the first ring of outlet air holes 243 may be greater than the air pressure of the gas blown out through the second ring of outlet air holes 244, and a pressure difference is formed, namely, the air volume of the outer ring is fast, the air pressure is large, the air volume of the central position is small, and the air pressure is low, and a fast circulating hot air can be formed in the cooking cavity 101.

The area of each air hole 24 in the first ring of outlet air holes 243 may be smaller than the area of each air hole 24 in the second ring of outlet air holes 244, and the flow velocity of the gas blown out from air hole 24 of the first ring of outlet air holes 243 is greater than the flow velocity of the gas blown out from the air hole 24 of the second ring of outlet air holes 244, and the air volume in the outer ring is fast and the air pressure is large, and the air volume in the inner ring is small and the air pressure is low. The gas blown out from the outer ring can form a forced heat convection, form a more stable gas flow channel, and flow through a longer path, which is easy to flow along the side wall of the cooking cavity 101 and the gas guide structure 50 into the gas flow channel 401, to achieve heating of the lower surface of the food. While, the gas blown out from the inner ring can be brought into contact with the heating apparatus 30 for a longer time to perform a more adequate heat exchange, to heat the food more adequately by the upper surface and the side surface of the food. The first ring of outlet air holes 243 cooperates with the second ring of outlet air holes 244 to facilitate the all-round three-dimensional heating of food and ensure the consistency of coloring.

The area of each air hole 24 in the third ring of outlet air holes 245 may be smaller than the area of each air hole 24 in the second ring of outlet air holes 244, and the gas blown out from the air hole 24 of the third ring of outlet air holes 245 has a fast flow velocity and a large air pressure. In fact, the air hole 24 near the interface of the outlet air hole 242 and the return air hole 241 does not have a very obvious boundary for the return air or the outlet air due to the actual error, the rotation speed of the fan blade part 23, etc. namely, the portion of the air hole 24 near the middle part of the outlet air hole 242 may be used for the return air, or the portion of the air hole 24 near the periphery of the return air hole 241 may be used for the outlet air. By spacing the second ring of outlet air holes 244 and the return air hole 241 through the third ring of outlet air holes 245, and reducing the area of the third ring of outlet air holes 245, the above error effect may be weakened, and the return air may be avoided from affecting the air outlet of the second ring of outlet air holes 244, which is conducive to improving the heat exchange effect and the effect of hot air circulation.

In some embodiments, the area of each air hole 24 in the return air holes 241 is smaller than the area of each air hole 24 in the second ring of outlet air holes 244, and the return air of the return air hole 241 has a fast return air velocity and a large air pressure, ensuring the balance between the outlet air and the return air, and facilitating the circulation of hot air.

It should be noted that the shape of each air hole 24 is not limited, and may be circular, square, trapezoidal, polygonal, irregular, etc. The arrangement shape of each ring of the outlet air hole groups includes, but is not limited to, circle, square, polygon, etc. In FIG. 17, the air holes 24 in the first ring of outlet air holes 243, the third ring of outlet air holes 245 and the return air hole 241 are circular, and the air hole

24 in the second ring of outlet air holes 244 is square for illustrative purposes only, not limiting the shape of each air hole 24.

In some embodiments of the present application, the ratio of the total area of the outlet air hole 242 to the total area of the return air hole 241 may be any value in the range of three to one-quarter, and in particular, may be three, two, one, one-half, one-third, one-quarter, etc. Within the above ratio range, it is easy to ensure the balance of the inlet air and the return air, to facilitate the hot air circulation.

In some embodiments of the present application, as shown in FIGS. 15-18, the driving cover body 22 may include the driving cover body bottom wall 223, which may include a driving cover body central bottom wall 228 and a driving cover body peripheral bottom wall 229 disposed around the driving cover body central bottom wall 228.

At least a part air holes of the first ring of outlet air holes 243 and the second ring of outlet air holes 244 may be disposed on the driving cover body peripheral bottom wall 229 to outlet air from the side, a portion of the gas blown out may be blown outwards and downwards towards the side wall of the cooking cavity 101 to easily flow towards the lower side of the food, and the other portion may spiral downwards and be blown towards the upper surface and the side surface of the food after adequate heat exchange with the heating apparatus 30. At least a part air holes of the third ring of outlet air holes 245 may be disposed on the driving cover body central bottom wall 228 to outlet air from the bottom surface, and the gas blown out may flow downwards and rapidly contact with the upper and side surfaces of the food. At least a part air holes of the return air holes 241 may be disposed on the driving cover body central bottom wall 228 to facilitate return air and gas circulation.

In some embodiments, as shown in FIGS. 15-18, the driving cover body central bottom wall 228 may be a flat bottom wall, and the driving cover body peripheral bottom wall 229 may be a divergent bottom wall. The small diameter end of the driving cover body peripheral bottom wall 229 is connected to the driving cover body central bottom wall 228, and the large diameter end of the driving cover body peripheral bottom wall 229 is located on the upper side of the driving cover body central bottom wall 228, and the driving cover body bottom wall 223 is formed into a basin shape, to forming the inner concave cavity body 227 on the upper side of the driving cover body bottom wall 223. The space size of the gas driving part cavity 211 in the driving cover body 22 is increased, and the gas may flow more adequately in the circumferential direction and the radial direction of the fan blade part 23 is ensured. Moreover, the driving cover body peripheral bottom wall 229 extending obliquely can reduce the resistance to the gas and reduce the air volume loss.

Here, the term "flat bottom wall" is to be understood in a broad sense, and the driving cover body central bottom wall 228 may be a bottom wall extending in a horizontal plane, or a bottom wall having a small dimension bend or arc. For example, in the examples included as shown in FIGS. 15-18, the middle part of the driving cover body central bottom wall 228 may be formed with a small size contour upward, the middle part contoured portion may be provided with a return air hole 241, and the other peripheral portion may be provided with a third ring of outlet air holes 245.

In some embodiments in which the heating apparatus 30 includes an inner peripheral heating apparatus 32, as shown in FIG. 19, the interface between the second ring of outlet air holes 244 and the third ring of outlet air holes 245 may correspond to the inner peripheral heating apparatus 32, and the inner peripheral heating apparatus 32 can adequately heat the gas blown out through the second ring of outlet air holes 244 and the third ring of outlet air holes 245, to improve the heat exchange efficiency, and the air resistance generated by the inner peripheral heating apparatus 32 provided at the interface is small and negligible, which is conducive to improving the adequacy of heat convection.

In some embodiments of the present application, as shown in FIG. 1, the cooking device 100 may further include a microwave transmitter 63 for emitting microwaves for microwave heating of food in the cooking cavity 101. The cooking device 100 has both a hot air heating function and a microwave heating function, and functions are more diverse. The microwave transmitter 63 may be provided at a side part of the housing 10, and the gas circulation apparatus 20 may be provided at a top part of the housing 10, to make full use of the space inside the housing 10, make the structure more compact, and make the outer appearance of the cooking device 100 less bulky.

In some embodiments, as shown in FIG. 1, the cooking device 100 may further include a control panel 64 through which a user may control the switching between the hot air heating function and the microwave heating function, as well as the working states of the respective components under the two heating functions, and the like.

With reference to FIGS. 1-19, the cooking device 100 according to some embodiments of the present application may include: a housing 10, a gas circulation apparatus 20, a heating apparatus 30, a shelf apparatus 40 and a gas guide structure 50. The housing 10 may have the cooking cavity 101, the gas circulation apparatus 20 may be disposed on the housing 10, and the gas circulation apparatus 20 may be configured to drive gas in the cooking cavity 101 to flow and circulate. The heating apparatus 30 is disposed in the cooking cavity 101 to heat the gas in the cooking cavity 101. The shelf apparatus 40 may include the bottom shelf 42 and the top shelf 41 disposed above the bottom shelf 42, the gap is formed between the top shelf 41 and the bottom shelf 42, and the gas is formed as the gas flow channel 401 located below the top shelf 41. The gas guide structure 50 may guide gas blown out by the gas circulation apparatus 20 to flow into the gas flow channel 401 and then pass through the top shelf 41.

In the related art, the hot air heating effect of a device with a hot air function (such as a microwave oven) is poor, in which the heat convection is inadequate and uneven, and takes too long time, resulting in uneven coloring, the upper surface of the food being extremely easy to burn, while the lower surface of the food being easily unable to be dehydrated and colored; and the volume of the hot air system thereof is large, and the volume of the device itself is also large, otherwise the hot air effect and the size of the cooking cavity are affected.

However, in the embodiment of the present application, when the gas circulation apparatus 20 works, the gas is circulated in the cooking cavity 101, and the heating apparatus 30 is located in the air duct and can heat the gas flowing therethrough. A portion of the heated gas can enter the top shelf 41 directly from the upper side; a portion of the heated gas enters the gas flow channel 401 under the guidance of the gas guide structure 50 and then enters into the top shelf 41 through the lower portion of the top shelf 41 to form a full range of three-dimensional heating of the food from the bottom, sides and top. Meanwhile, the cooking cavity 101 is partitioned into two sections by the shelf apparatus 40 to increase the heat density of the upper space, to achieve an excellent cooking effect.

The housing 10, the gas circulation apparatus 20, the heating apparatus 30, the shelf apparatus 40 and the gas guide structure 50 cooperate to form an inner hot air duct in the cooking cavity 101. In the case of a certain contour volume of the cooking device 100 (for example, making the contour volume of the cooking device 100 the same as that of an existing microwave oven), the cooking effect of the cooking device 100 in terms of air frying may be greatly improved; the forced heat convection occurs more adequately; the temperature field distribution is more even; the heating evenness and the coloring consistency of food can be easily achieved; the cooking time can be greatly shortened; the excellent effect of cooking with a large amount of food can be satisfied; the temperature monitoring data can more accurately reflect the heating temperature of the food to achieve accurate control of the heating process. Besides there is also no need to increase the volume of the cooking device 100, to maintain the overall aesthetics of the cooking device 100, and reducing the occupied space.

Other particular structures and beneficial effects of the cooking device 100 according to an embodiment of the present application can be described with reference to the foregoing embodiments, and will not be described in detail herein.

Other configurations and operations of the shelf apparatus 40 and cooking device 100 according to the embodiment of the present application.

In the description of the present application, it should be noted that, unless expressly specified and limited otherwise, the terms "mounted", "communicated", and "connected" are to be interpreted broadly, e.g., either fixedly or detachably, or integrally; may be mechanically connected or an electrically connected; may be directly connected or indirectly connected via an intermediate medium, and may be the communication between two elements. The specific meaning of the above terms in the present application can be understood in detail.

In the description of the present specification, references to descriptions of the terms "embodiments", "particular embodiments", "examples", etc. mean that a particular feature, structure, material, or characteristic described in connection with the embodiment or example is included in at least one embodiment or example of the present application. In this specification, schematic representations of the above terms do not necessarily refer to the same embodiment or example. Furthermore, the particular features, structures, materials, or characteristics described may be combined in any suitable manner in any one or more embodiments or examples.

What is claimed is:

1. A cooking device, comprising:
a housing having a cooking cavity;
a gas circulation apparatus disposed in the housing and configured to drive gas in the cooking cavity to flow and circulate, wherein the gas circulation apparatus comprises a gas driving part, wherein the gas driving part comprises a driving cover body and a fan blade part rotatably disposed in the driving cover body, the driving cover body having a plurality of air holes being provided on a side surface of the driving cover body facing towards the cooking cavity; and
a heating apparatus disposed in the cooking cavity and adjacent to the plurality of air holes, wherein the heating apparatus comprises an outer peripheral heating apparatus, an area enclosed by the outer peripheral heating apparatus accounting for at least half of a cross-sectional area of the cooking cavity, wherein the plurality of air holes comprise return air holes and outlet air holes disposed around the return air holes, wherein the outlet air holes comprise:

a first ring of outlet air holes;

a second ring of outlet air holes, the first ring of outlet air holes being disposed around the second ring of outlet air holes; and a third ring of outlet air holes, the second ring of outlet air holes being disposed around the third ring of outlet air holes, wherein:

an area of each air hole in the first ring of outlet air holes is smaller than an area of each air hole in the second ring of outlet air holes; and/or an area of each air hole in the third ring of outlet air holes is smaller than the area of each air hole in the second ring of outlet air holes.

2. The cooking device according to claim 1, wherein the area enclosed by the outer peripheral heating apparatus accounts for one-half to three-quarters of the cross-sectional area of the cooking cavity.

3. The cooking device according to claim 2, wherein the heating apparatus further comprises an inner peripheral heating apparatus surrounded by the outer peripheral heating apparatus, the inner peripheral heating apparatus being connected in series or in parallel with the outer peripheral heating apparatus.

4. The cooking device according to claim 3, wherein each of the outer peripheral heating apparatus and the inner peripheral heating apparatus is arranged around a central axis of the cooking cavity.

5. The cooking device according to claim 1, wherein a total area of the plurality of air holes accounts for at least half of the cross-sectional area of the cooking cavity.

6. The cooking device according to claim 5, wherein the total area of the plurality of air holes accounts for one-half to two-thirds of the cross-sectional area of the cooking cavity.

7. The cooking device according to claim 1, wherein an area of each air hole in the return air holes is smaller than the area of each air hole in the second ring of outlet air holes.

8. The cooking device according to claim 1, wherein the driving cover body comprises a driving cover body bottom wall, wherein the driving cover body bottom wall comprises a driving cover body central bottom wall and a driving cover body peripheral bottom wall disposed around the driving cover body central bottom wall, at least a part air holes of the first ring of outlet air holes and the second ring of outlet air holes being disposed at the driving cover body peripheral bottom wall, and at least a part air holes of the third ring of outlet air holes and the return air holes being disposed at the driving cover body central bottom wall.

9. The cooking device according to claim 8, wherein:

the driving cover body central bottom wall is a flat bottom wall;

the driving cover body peripheral bottom wall is a divergent bottom wall; and a small diameter end of the driving cover body peripheral bottom wall is connected to the driving cover body central bottom wall.

10. The cooking device according to claim 9, wherein the heating apparatus further comprises an inner peripheral heating apparatus surrounded by the outer peripheral heating apparatus, an interface between the second ring of outlet air holes and the third ring of outlet air holes corresponding to the inner peripheral heating apparatus.

11. The cooking device according to claim 1, wherein a ratio of a total area of the outlet air holes and a total area of the return air holes ranges from three to one-quarter.

12. The cooking device according to claim 1, wherein the driving cover body comprises a driving cover body top wall and a driving cover body side wall, wherein:

the driving cover body side wall is a divergent side wall;

a small diameter end of the driving cover body side wall is connected to the driving cover body top wall; and a large diameter end of the driving cover body side wall faces away from the driving cover body top wall.

13. The cooking device according to claim 12, wherein the driving cover body side wall has a virtual extension surface extending towards the cooking cavity, wherein a range formed by deflecting a predetermined small angle $\beta$ towards two sides of the virtual extension surface with the large diameter end of the driving cover body side wall as a fulcrum is a preset range, and wherein a peripheral edge of the heating apparatus does not exceed the preset range.

14. The cooking device according to claim 13, wherein the small angle $\beta$ satisfies a relationship: $0°<\beta\leq10°$.

15. The cooking device according to claim 12, wherein an included angle $\gamma$ between the driving cover body side wall and a cross-section of the cooking cavity ranges from 15° to 75°.

16. The cooking device according to claim 1, wherein when driven by the gas driving part, gas has a first part flowing in a first direction and a second part flowing in a second direction, one of the first direction and the second direction being a circumferential direction of the gas driving part, and another of the first direction and the second direction being a radial direction of the gas driving part.

17. The cooking device according to claim 1, wherein an area of each air hole in the third ring of outlet air holes is smaller than the area of each air hole in the second ring of outlet air holes.

18. A cooking device, comprising:

a housing having a cooking cavity;

a gas circulation apparatus disposed in the housing and configured to drive gas in the cooking cavity to flow and circulate, wherein the gas circulation apparatus comprises a gas driving part, wherein the gas driving part comprises a driving cover body and a fan blade part rotatably disposed in the driving cover body, the driving cover body having a plurality of air holes being provided on a side surface of the driving cover body facing towards the cooking cavity; and a heating apparatus disposed in the cooking cavity and adjacent to the plurality of air holes, wherein the heating apparatus comprises an outer peripheral heating apparatus, an area enclosed by the outer peripheral heating apparatus accounting for at least half of a cross-sectional area of the cooking cavity, wherein the plurality of air holes comprise return air holes and outlet air holes disposed around the return air holes, wherein the outlet air holes comprise:

a first ring of outlet air holes;

a second ring of outlet air holes, the first ring of outlet air holes being disposed around the second ring of outlet air holes; and a third ring of outlet air holes, the second ring of outlet air holes being disposed around the third ring of outlet air holes, wherein an air pressure of gas blown out through the first ring of outlet air holes is greater than an air pressure of gas blown out through the second ring of outlet air holes.

19. The cooking device according to claim 18, wherein the area enclosed by the outer peripheral heating apparatus accounts for one-half to three-quarters of the cross-sectional area of the cooking cavity.

20. The cooking device according to claim 18, wherein a total area of the plurality of air holes accounts for at least half of the cross-sectional area of the cooking cavity.

\* \* \* \* \*